United States Patent [19]
Besson

[11] Patent Number: 5,397,954
[45] Date of Patent: Mar. 14, 1995

[54] ELASTIC SUPPORT DEVICE FOR STATOR WINDING END TURNS

[75] Inventor: Alain Besson, Valdoie, France

[73] Assignee: Gec Alsthom Electromecanique SA, Paris, France

[21] Appl. No.: 77,033

[22] Filed: Jun. 16, 1993

[30] Foreign Application Priority Data

Jun. 17, 1992 [FR] France ............ 92 07344

[51] Int. Cl.6 ................................. H02K 3/46
[52] U.S. Cl. ........................ 310/260; 310/51; 310/91
[58] Field of Search ........... 310/260, 270, 43, 45, 310/51, 91, 256

[56] References Cited

U.S. PATENT DOCUMENTS

| 1,122,187 | 12/1914 | Behrend | 310/260 |
|---|---|---|---|
| 3,691,416 | 9/1972 | Drexler et al. | |
| 3,991,334 | 11/1976 | Cooper et al. | |
| 4,088,913 | 5/1978 | Prigorovsky | 310/260 |
| 4,238,339 | 12/1980 | Khutoretsky | 310/260 |
| 4,379,243 | 4/1983 | Dailey | 310/260 |
| 4,484,096 | 11/1984 | Sauerwein | 310/260 |
| 4,501,985 | 2/1985 | Dobson | 310/260 |
| 4,942,326 | 7/1990 | Butler, III | 310/260 |
| 5,051,642 | 9/1991 | Hediger | 310/260 |

FOREIGN PATENT DOCUMENTS

| 2254902 | 7/1975 | France . | |
|---|---|---|---|
| 1053092 | 3/1959 | Germany | 310/260 |
| 2161139 | 6/1973 | Germany . | |
| 1289826 | 9/1972 | United Kingdom . | |
| 1289827 | 9/1972 | United Kingdom . | |

Primary Examiner—R. Skudy
Attorney, Agent, or Firm—Sughrue, Mion, Zinn, Macpeak & Seas

[57] ABSTRACT

An elastic support device for stator winding end turns of a rotating electrical machine comprises a supporting cage fixed by supports to the clamping plate of the machine. The device has an elastic system for fixing the supports to the clamping plate comprising at least one ring to which the supports are fixed and which is fastened to the clamping plate by fasteners.

6 Claims, 6 Drawing Sheets

ELASTIC SUPPORT DEVICE FOR STATOR WINDING END TURNS

BACKGROUND OF THE INVENTION

1. Field of the Invention

The invention concerns an elastic support device for stator winding end turns of a rotating electrical machine, for turbo-alternators in particular.

2. Description of the prior art

Stator winding end turns 50 (FIG. 1) must be supported elastically because they are subject to stresses and deformation due to possible short-circuits, sudden fluctuations in current, thermal expansion and other causes.

Stator winding end turns 50 are supported by a cage 30 in the form of a plurality of rings concentric with the magnetic circuit and resting on insulative supports equi-angularly distributed around the stator. The cage is fixed to the stator clamping plate by angle-brackets 37 usually of a magnetic stainless steel (see FIG. 1). A first side of the angle-brackets is fixed to the clamping plate with a damper screen between them. The second side is fixed to the insulative support of the cage. The flexibility of the angle-brackets gives the stator winding end turns the required elasticity.

The use of angle-brackets raises a number of problems. It is difficult to distribute them circumferentially on the clamping plate with sufficient accuracy. Some angle-brackets may break in operation because of the loads on them and the resulting asymmetry is prejudicial to proper operation of the machine. There is also some uncertainty as to the bearing engagement of the angle-brackets, any defective bearing engagement causing an offset and vibration of the winding.

An object of the device in accordance with the invention is to increase the mechanical strength of the cage and of the means retaining the stator winding end turns 50 by replacing the metal angle-brackets 37 used until now by a ring having a spring effect, i.e. an elastic ring.

Using a ring instead of angle-brackets means that the damper screen fixing function and the cage fixing function can be separated. The ring may be made from a magnetic stainless steel or from fiberglass impregnated with epoxy resin.

Another advantage of the new structure is the saving in terms of assembly time. The various components are also easier to assemble.

SUMMARY OF THE INVENTION

The invention consists in an elastic support device for stator the winding end turns 50 of a rotating electrical machine comprising a supporting cage fixed by means of supports to the clamping plate of the machine, the device comprising elastic fixing means for fixing the supports to the clamping plate and comprising at least one ring to which the supports are fixed and which is fastened to the clamping plate by fastening means.

The device may further comprise a damper screen between the clamping plate and said ring and fixed to the clamping plate independently of the ring. Compared with the prior art devices, the damper screen has fewer fixing holes. It is therefore simpler to manufacture and quicker to fit.

The means for fastening the ring to the clamping plate may comprise centring bushes. This enables fast and accurate fitting of the ring to the clamping plate. The ring may advantageously be formed from a plurality of sectors fastened together, for example three or four sectors. This means that the sectors can be machined in a single operation simply by stacking them.

Another advantage of the present invention is that the ring requires fewer fixing points on the clamping plate than the angle-brackets. This means that the holes for handling the clamping plate may be used to fix the elastic ring. The clamping plate therefore comprises a limited number of holes so that it is simpler and faster to machine.

The invention will be better understood and other advantages and features of the invention will emerge from the following description given by way of non-limiting example with reference to the accompanying appended drawings.

DETAILED DESCRIPTION OF THE INVENTION

Figure 1:
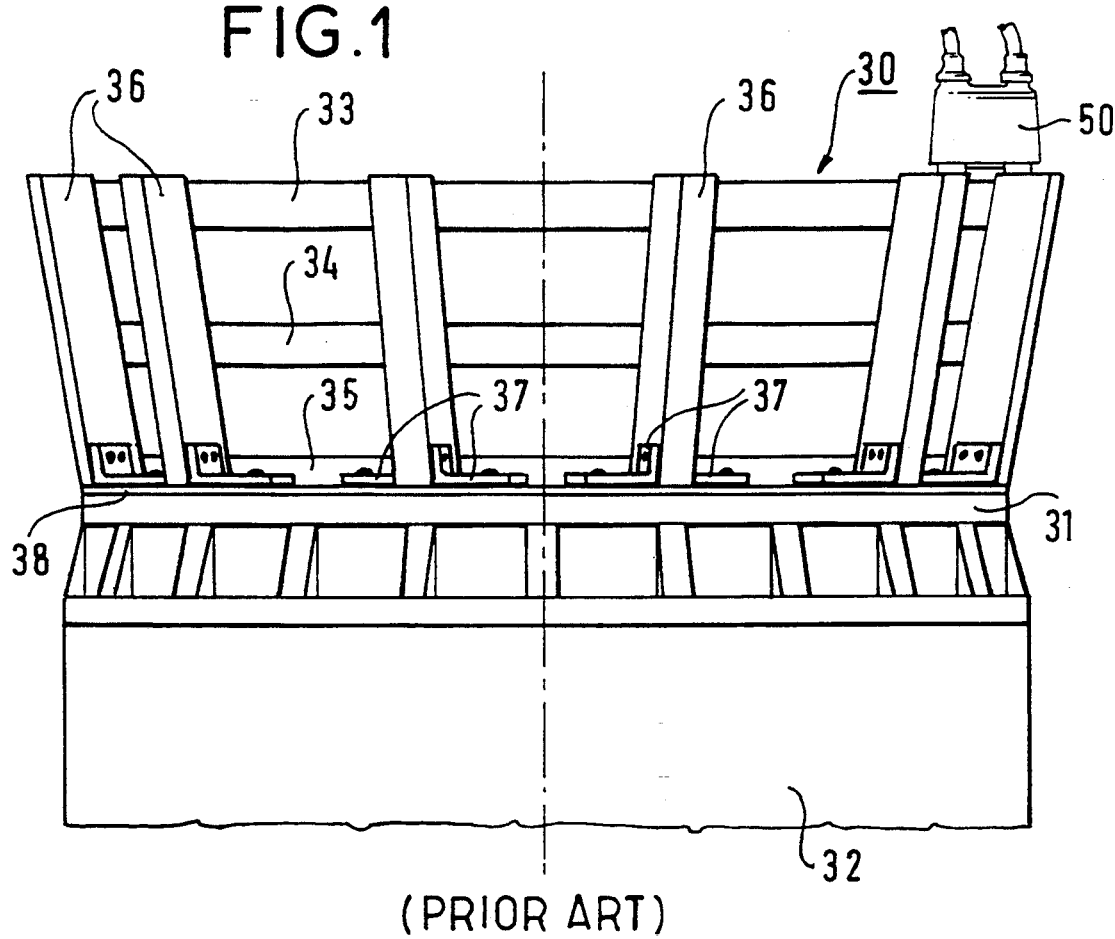
FIG. 1 shows a prior art supporting cage.
Figure 1A:
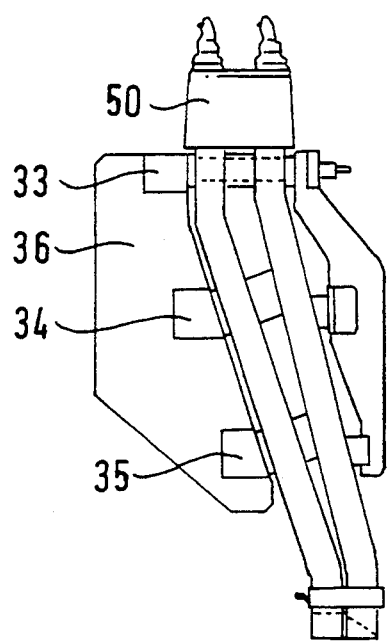
FIG. 1A is a sectional view of a portion of FIG. 1 and illustrates the manner in which the stator winding end turns are supported by the prior art supporting cage.

FIG. 1 is a side view of a prior art supporting cage 30 fixed to the clamping plate 31 of the stator 32. The cage comprises three regularly spaced rings 33, 34 and 35 concentric with the stator axis and made of wood, for example. The rings are supported by supports 36 shown here in a simplified form and regularly spaced around the clamping plate. Each support 36 is bolted to the clamping plate by two angle-brackets 37 with the damper screen 38 inserted between them to protect against magnetic and electric flux. The first side of the angle-brackets is fixed to the clamping plate 31 and the second side is fixed to the insulative supports 36.

Figure 2:
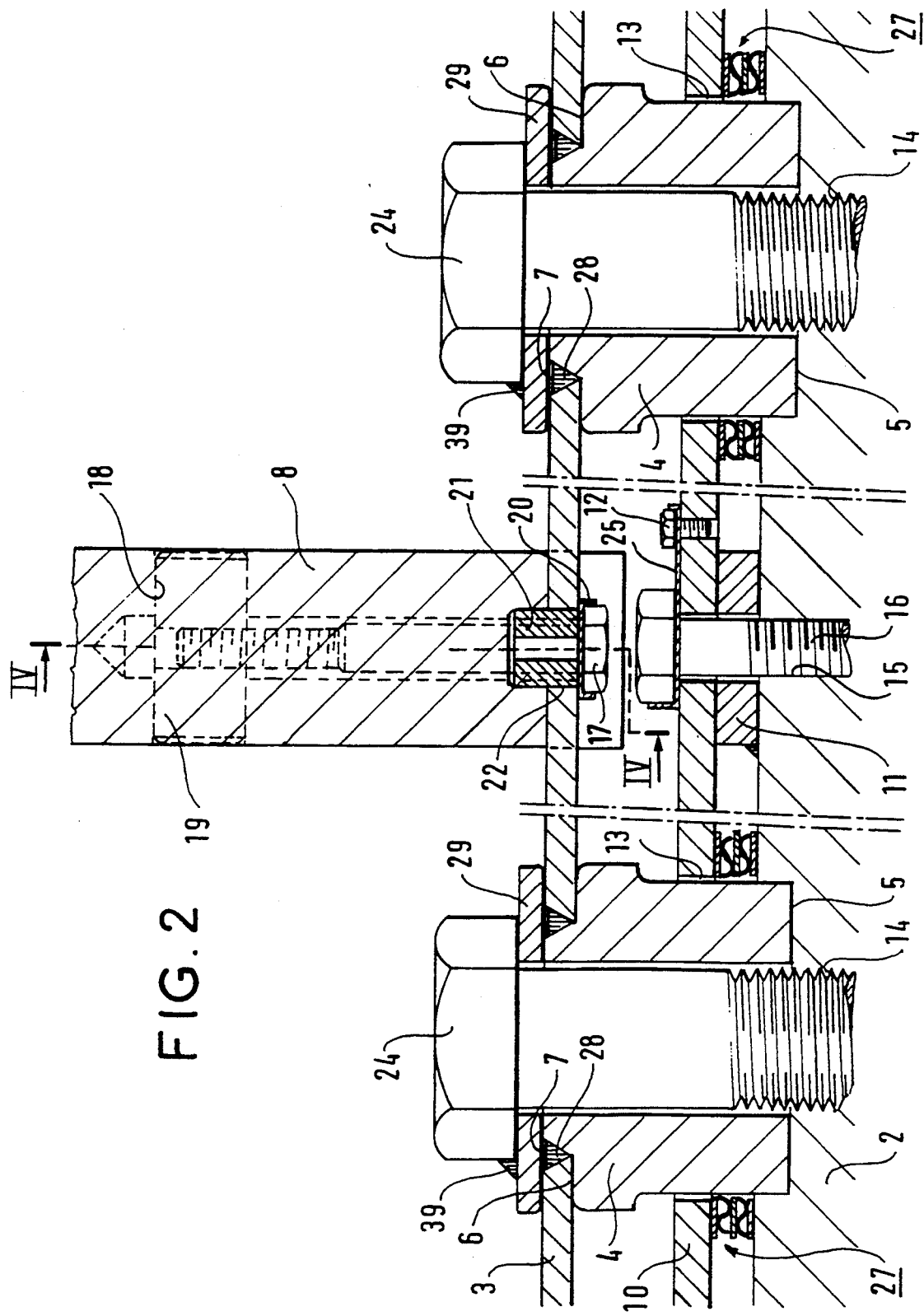
FIG. 2 is a view in cross-section taken along line II—II of FIG. 3) of part of the elastic support device in accordance with the invention.
Figure 3:
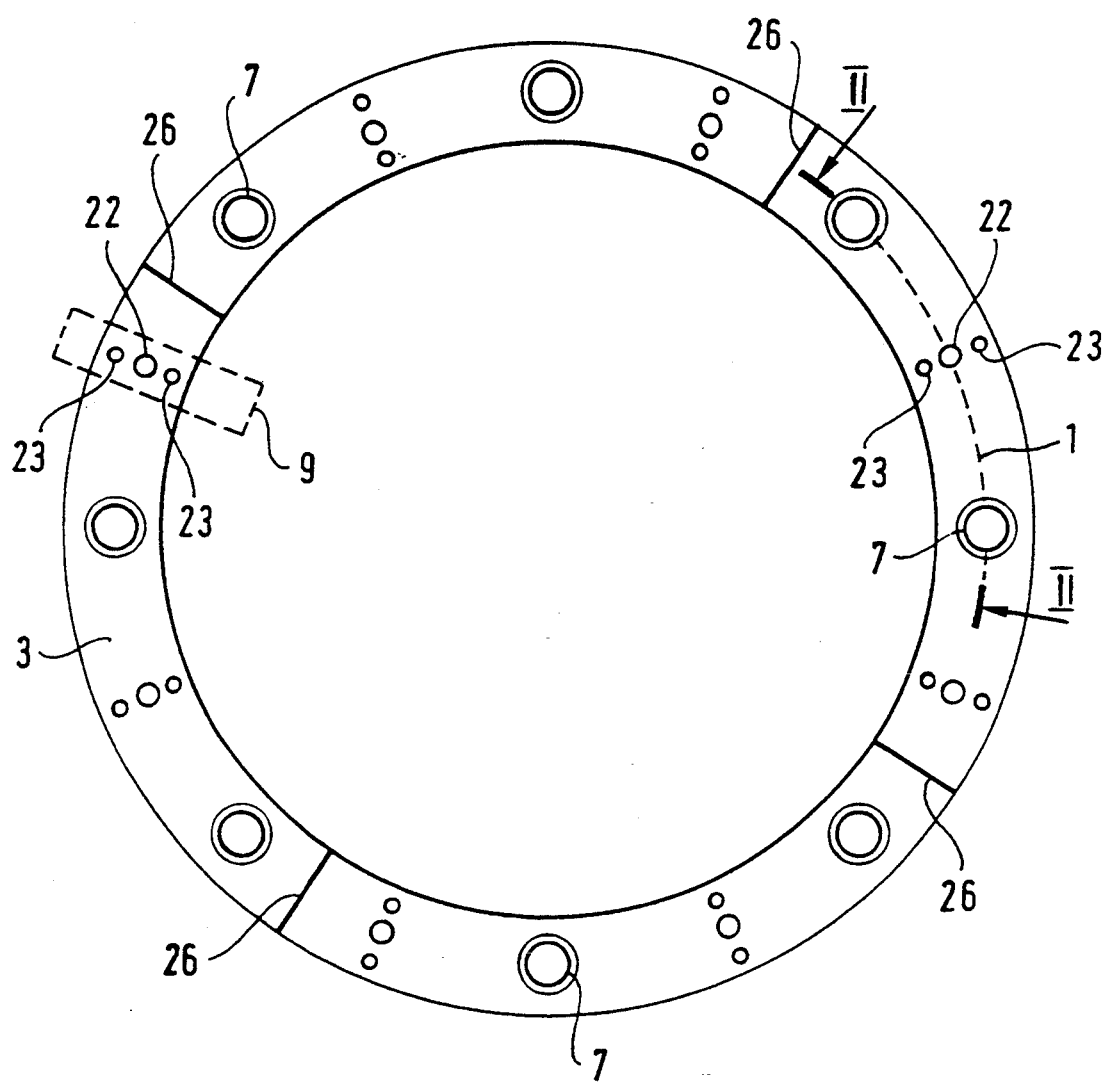
FIG. 3 is a plan view of the elastic ring.

FIG. 2 is a view in cross-section on the median axis II of the ring (see FIG. 3). The elastic ring 3 is fitted to the clamping plate 2 by means of centering bushings 4. These bushings are a tight fit in spot-faced recesses 5 regularly distributed on the clamping plate. At the end opposite the clamping plate the bushings have a shoulder 6 receiving the ring. To this end the ring 3 has chamfered holes 7 in it fitting over the reduced diameter ends of the bushes.

The insulative supports 8 are fixed to the elastic ring 3 in a regular arrangement. FIG. 3 shows in dashed outline the location 9 of one of the insulative supports on the ring, mid-way between two adjacent ones of the recesses 5 shown in FIG. 2.

The damper screen 10 is placed between the clamping plate 2 and the elastic ring 3. It is spaced from the clamping plate by spacers 11 and has holes 13 through it for the centering bushings 4.

Screwthreaded holes are provided in the clamping plate: screwthreaded holes 14 in the recesses 5 for fixing the elastic ring and screwthreaded holes 15 for fixing the damper screen.

To mount the supporting cage on the machine the damper screen is first fixed to the clamping plate. The insulative supports and the supporting rings are mounted separately on the elastic ring. The elastic ring fitted with the supporting cage is then attached to the clamping plate fitted with the damper screen and the centering bushing.

The damper screen 10 is fixed by means of clamping bolts 16 passing through the screen and the spacers 11 and into the screwthreaded holes 15. The head of the bolt 16 may be immobilized relative to the screen 10 by a safety washer 25 attached to the screen by a bolt 12.

Figure 4:
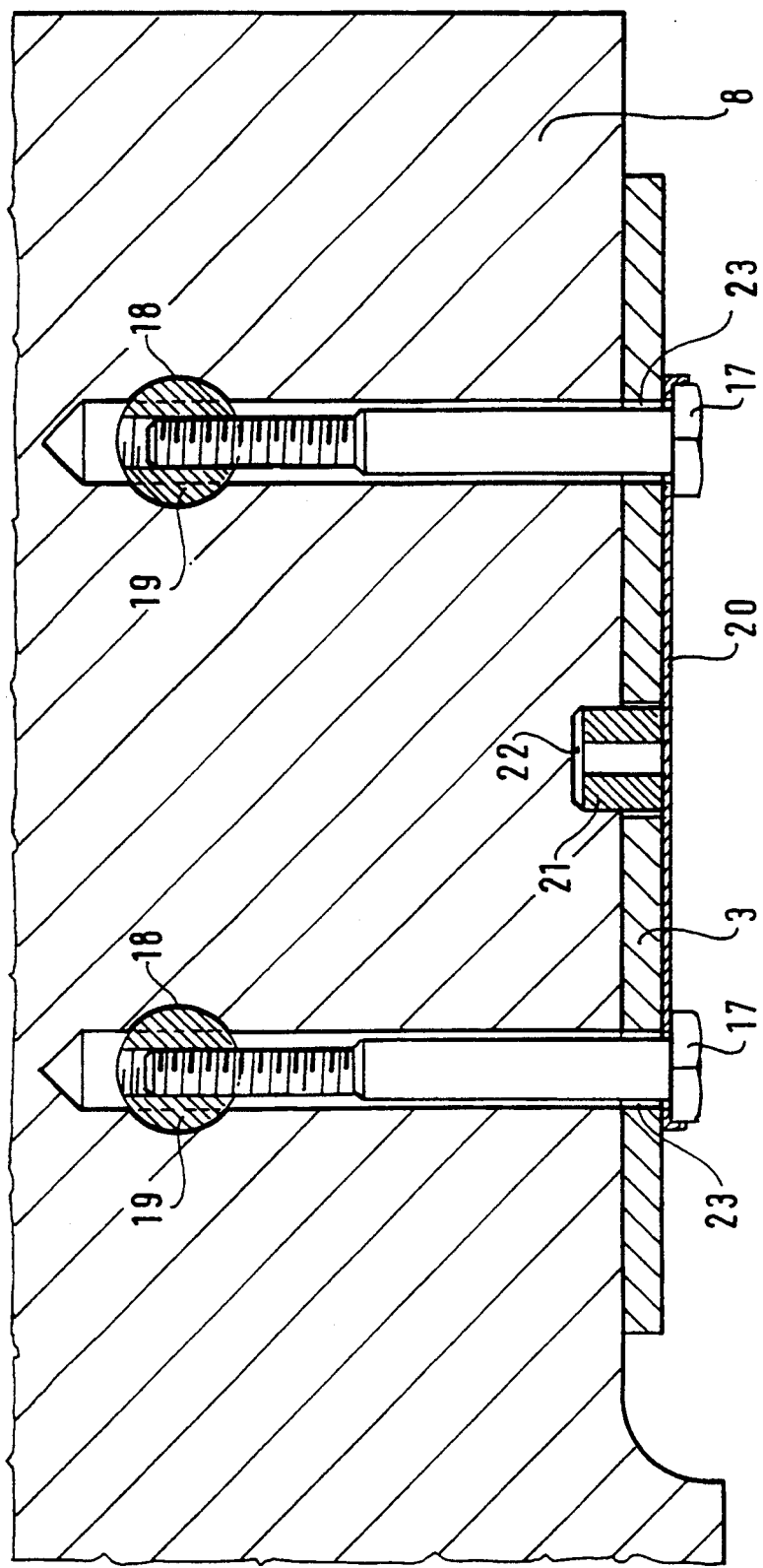
FIG. 4 is a detail view of part of FIG. 2.
Figure 5:
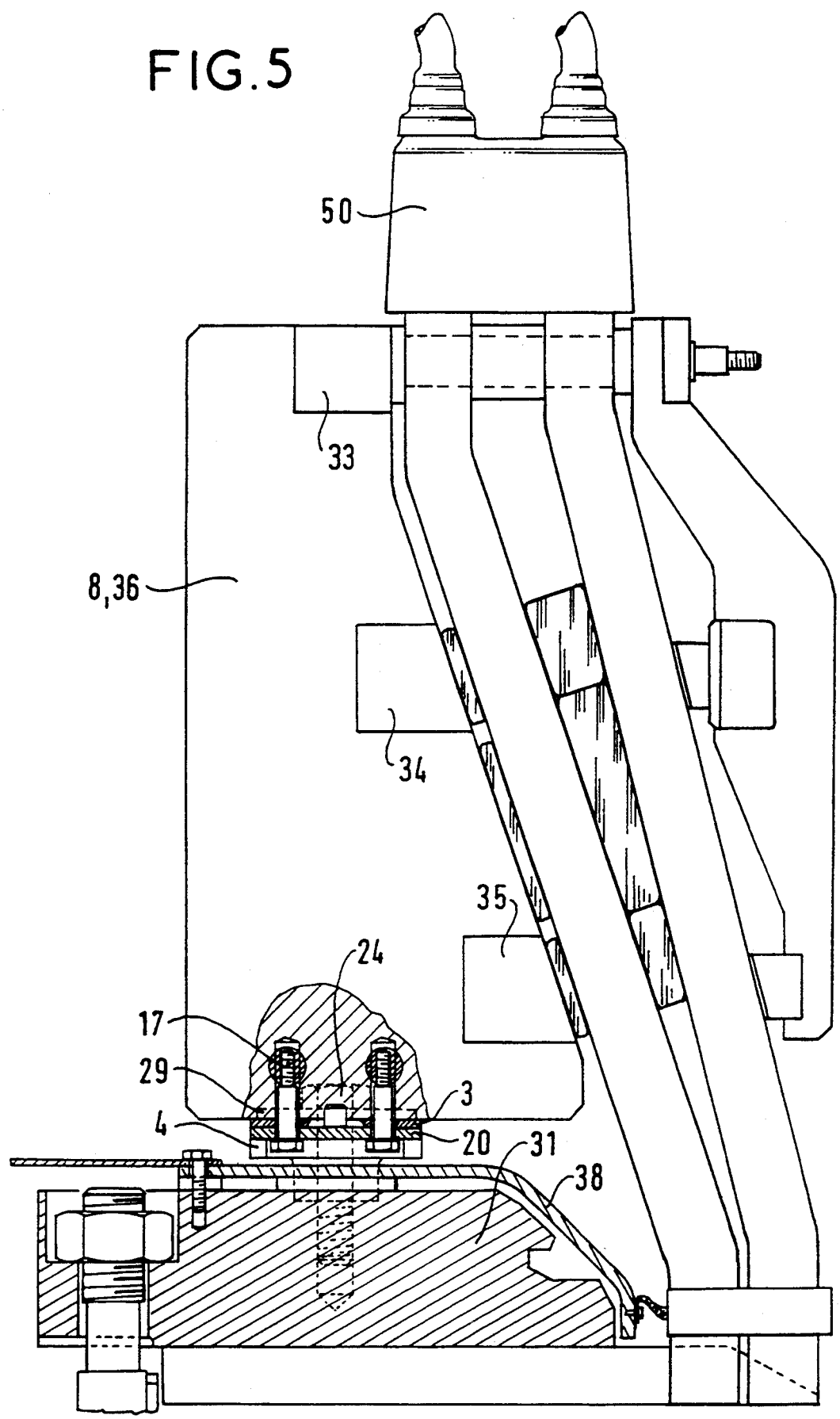
FIG. 5 is a partial sectional view of FIG. 2 and illustrates the manner in which the prior art end turns are supported on a supporting cage by the elastic support device illustrated in FIGS. 2, 3 and 4.

The insulative supports 8 may be bolted to the ring 3. Two bolts 17 pass through the ring 3 and part of the support 8 into a machined hole 18 transverse to the bolts (see FIG. 4). The insulative support 8 is fixed to the ring by the bolts 17 and cylindrical nuts 19 with a double safety washer 20 to immobilize the bolts. A pin 21 between the bolts 17 locates the insulative support. The holes 23 for the bolts 17 in the elastic ring and the hole 22 for the pin 21 can be seen more clearly in in the plan view of FIG. 3. The holes 22 and 23 may have the same diameter. The pin is immobilized on the elastic ring when the double safety washer 20 is clamped under the heads of the bolts 17.

The ring assembly is fixed to the clamping plate by bolts 24 which pass through the washers 29 and the bushing 4 into the screwthreaded holes 14. The bolts may be immobilized by welds 28 as shown in FIG. 2. Each bolt 24 is fixed to its washer 29 by spot welds 39.

In the example shown in FIG. 2 the bolt 16 and the pin 21 are coaxial.

Figure 6:
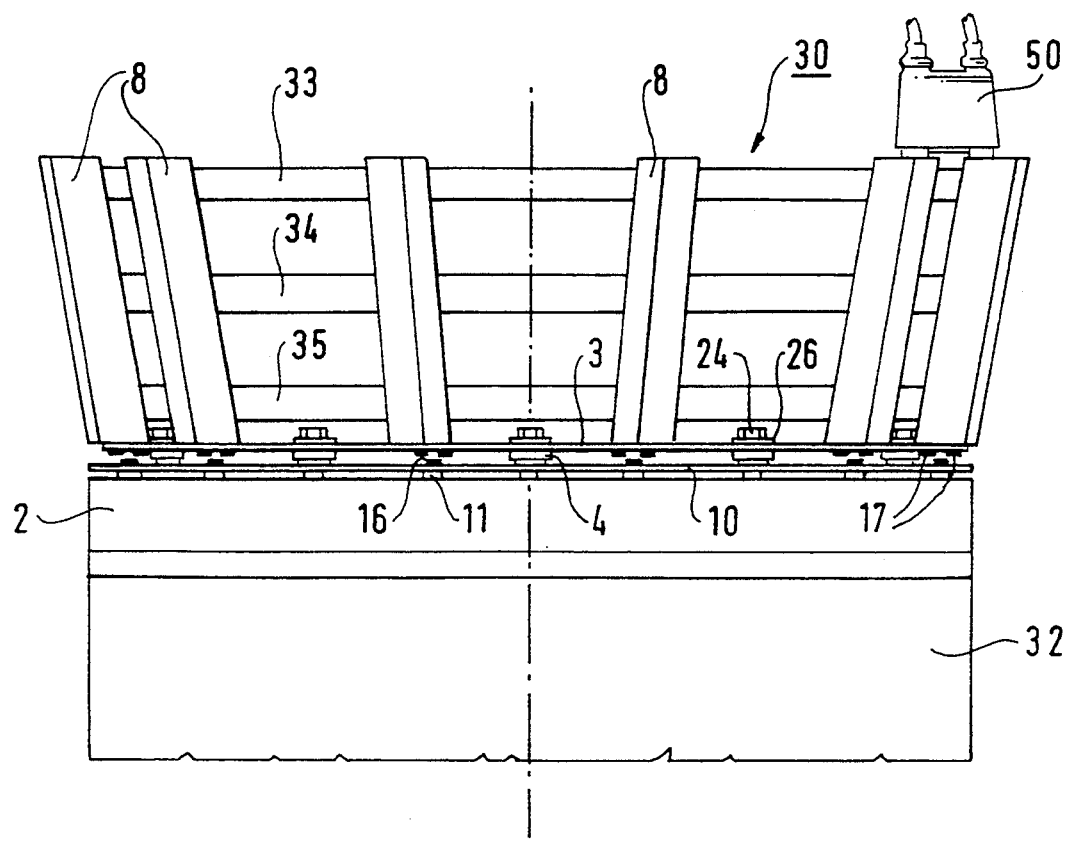
FIG. 6 is a side view like FIG. 1 but shows the inventive elastic ring relative to a supporting cage 30 and winding end turns 50, as already illustrated in the cross-sectional view of FIG. 2.

As clearly shown in FIGS. 2 and 6, the clamping plate 2, the elastic ring 3 and the damper screen 10 are disposed in respective planes which are parallel to each other and which are perpendicular to the cage axis and the supports 8.

FIG. 3 shows that the elastic ring comprises four identical sectors joined together by welds 26. The elasticity of the ring 3 is due to the large distance between the points at which it is fixed to the clamping plate and to the nature of the material from which it is made. This is preferably a magnetic stainless steel or fiberglass impregnated with epoxy resin.

Laminated sealing washers 27 (combining washers and spring members) may be fitted around the bushing 4 between the clamping plate 2 and the damper screen 10. This prevents leakage of cooling gas confined in the space between the clamping ring and the damper screen.

The description has been concerned with a device with only one ring. If the clamping plate is in the form of a torus two concentric rings are used, of different diameter and disposed at different levels in substitution for angle-brackets disposed in the same manner.

The effect of the ring is to increase the mechanical strength of the supporting assembly and to reduce vibration at the end turns 50 and the connections, combined with improved retention of the latter and an increased service life for the machine. Forces are transmitted directly to the clamping plate. The invention eliminates adjustments between the clamping plate and the supporting cage.

This new design can be adapted to all types of alternator, whether they have plane or molded clamping plates. On molded clamping plates it is possible to adjust the bearing engagement between the outer ring and the inner ring by virtue of the flexibility of the rings and by adjustment of the centering bushing.

What is claimed is:

1. An elastic support device for stator winding end turns of a rotating electrical machine comprising a supporting cage which has a central axis, which supports the end turns and which is fixed by means of supports to a clamping plate of said machine, said device comprising elastic fixing means for fixing said supports to said clamping plate, and said elastic fixing means comprising at least one elastic ring to which said supports are fixed and which is fastened to said clamping plate by fastening means; said device further comprising a damper screen between said clamping plate and said ring, and means for fixing said damper screen to said clamping plate independently of said ring;

wherein said clamping plate (2), said elastic ring (3) and said damper screen (10) are disposed in respective planes which are parallel to each other and which are perpendicular to said cage axis and to said supports (8).

2. The device according to claim 1 wherein the means for fastening said ring to said clamping plate comprise centering bushings.

3. The device according to claim 1 wherein the ring is formed by a plurality of sectors fastened together.

4. The device according to claim 1 wherein said ring is made from a material selected from a group consisting of a magnetic stainless steel and fiberglass impregnated with epoxy resin.

5. An elastic support device for stator winding end turns of a rotating electrical machine comprising a supporting cage which supports the end turns and which is fixed by means of supports to a clamping plate of said machine, said device comprising elastic fixing means for fixing said supports to said clamping plate, and said elastic fixing means comprising at least one ring to which said supports are fixed and which is fastened to said clamping plate by fastening means; said device further comprising a damper screen between said clamping plate and said ring, and means for fixing said damper screen to said clamping plate independently of said ring; wherein the means for fastening said ring to said clamping plate comprise centering bushing, and wherein said damper screen is separated from said clamping plate by spacers, said device further comprising sealing members disposed between said damper screen and said centering bushings.

6. The device according to claim 5, wherein said centering bushings are regularly spaced around said clamping plate.

* * * * *